(12) United States Patent
Hayashi

(10) Patent No.: US 10,666,388 B2
(45) Date of Patent: May 26, 2020

(54) ENCODER SIGNAL PROCESSING DEVICE AND ENCODER

(71) Applicant: FANUC CORPORATION, Yamanashi (JP)

(72) Inventor: Shinichirou Hayashi, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 0 days.

(21) Appl. No.: 16/361,415

(22) Filed: Mar. 22, 2019

(65) Prior Publication Data

US 2019/0296856 A1 Sep. 26, 2019

(30) Foreign Application Priority Data

Mar. 26, 2018 (JP) .................................. 2018-057945

(51) Int. Cl.
*H03M 13/11* (2006.01)
*H03M 13/00* (2006.01)
*H04L 1/00* (2006.01)

(52) U.S. Cl.
CPC .................................. *H04L 1/0041* (2013.01)

(58) Field of Classification Search
CPC .................................. G01D 5/00; H04L 1/0041
See application file for complete search history.

(56) References Cited

U.S. PATENT DOCUMENTS

| 6,519,043 B1* | 2/2003 | Wang | G01B 11/306 356/614 |
| 2003/0076903 A1 | 4/2003 | Ashley et al. | |
| 2003/0160160 A1* | 8/2003 | Taniguchi | H03M 1/1038 250/231.13 |
| 2004/0156451 A1* | 8/2004 | Lee | H04L 27/066 375/326 |

(Continued)

FOREIGN PATENT DOCUMENTS

| CN | 103869162 A | 6/2014 |
| JP | 3772121 B2 | 5/2006 |

(Continued)

OTHER PUBLICATIONS

Office Action issued in JP 2018-057945; mailed by the Japanese Patent Office dated Dec. 17, 2019.

*Primary Examiner* — Guy J Lamarre
(74) *Attorney, Agent, or Firm* — Studebaker & Brackett PC

(57) ABSTRACT

An encoder signal processing device includes a position data acquisition unit, an error data calculation unit that calculates error data in a predetermined number of position data in one cycle, and a compensation unit that compensates the position data based on the calculated error data, in which the error data calculation unit calculates first error data in the predetermined number of position data sampled at first predetermined time intervals $\Delta Tn$ in one cycle, defines the first error data as the error data, calculates second error data in position data sampled at second predetermined time (Continued)

intervals $\Delta Tk$ in each of the first predetermined time intervals $\Delta Tn$, and changes a time interval of the error data without increasing or decreasing the predetermined number of error data by replacing second error data closest to a local extremum or inflexion point in error characteristics of the first and second error data with the first error data.

6 Claims, 9 Drawing Sheets

(56) References Cited

U.S. PATENT DOCUMENTS

| | | | | |
|---|---|---|---|---|
| 2005/0058184 A1* | 3/2005 | Paul | ................. | H04L 7/0029 375/148 |
| 2010/0299094 A1* | 11/2010 | Hsu | ................. | G01B 5/0014 702/95 |
| 2010/0303460 A1* | 12/2010 | Hunter | ................. | G01D 5/24419 398/25 |
| 2014/0135948 A1* | 5/2014 | Kanzaki | ................. | G05B 13/041 700/54 |

FOREIGN PATENT DOCUMENTS

| JP | 2012163436 A | 8/2012 |
|---|---|---|
| JP | 2014-115132 A | 6/2014 |
| JP | 2018-021845 A | 2/2018 |

* cited by examiner

ENCODER SIGNAL PROCESSING DEVICE AND ENCODER

This application is based on and claims the benefit of priority from Japanese Patent Application No. 2018-057945, filed on 26 Mar. 2018, the content of which is incorporated herein by reference.

BACKGROUND OF THE INVENTION

Field of the Invention

The present invention relates to an encoder signal processing device and an encoder.

Related Art

There is known an encoder that detects the position (or speed) of a motor or a table (measurement target) in a machine tool or an industrial machine, and the like. Examples of such an encoder include a rotary encoder that detects rotation angle (position) and a linear scale that detects linear movement positons. This type of encoder signal processing device samples analog signals that are periodically generated according to movement of a measurement target, to thereby generate positon data according to the position of the measurement target. In this case, the encoder signal processing device performs interpolation to compensate interpolation errors (see, for example, Patent Documents 1 and 2).

For example, the encoder signal processing device described in Patent Document 2 calculates error data on the basis of the difference between a predetermined number of pieces of position data sampled at equal intervals in one cycle and ideal position data, and compensates the position data on the basis of the calculated error data.

Patent Document 1: Japanese Unexamined Patent Application, Publication No. 2012-163436
Patent Document 2: Japanese Patent No. 3772121

SUMMARY OF THE INVENTION

However, with the encoder signal processing device described in Patent Document 2, due to faster computation and reduced register capacity of the signal processing device, the number of sampling of the error data is made to be less than the number of sampling of the position data, and the position data is compensated through performing interpolation (for example, linear interpolation) on the error data. In this case, local extrema (extremal value, stationary point) in error characteristics of the error data may be overlooked and errors may remain in the compensated position data.

It is an object of the present invention to provide an encoder signal processing device and an encoder that reduce interpolation errors.

(1) An encoder signal processing device (for example, an encoder signal processing device D to be described later) according to the present invention is an encoder signal processing device that performs signal processing on analog signals that are periodically generated according to movement of a measurement target, to thereby generate position data according to the position of the measurement target, the encoder signal processing device including: a position data acquisition unit (for example, analog amplification circuits $1a$ and $1b$, analog-to-digital conversion circuits $2a$ and $2b$, and a digital interpolation circuit 3 to be described later) that samples the analog signals to acquire the position data according to the position of the measurement target; an error data calculation unit (for example, a detection error data calculation circuit 4 to be described later) that calculates error data on the basis of a difference between a predetermined number of pieces of position data among position data for one cycle acquired by the position data acquisition unit and ideal position data that assumes that the position moves linearly in one cycle; and a compensation unit (for example, a detection error compensation circuit 5 to be described later) that compensates the position data acquired by the position data acquisition unit on the basis of the error data calculated by the error data calculation unit, the error data calculation unit calculating first error data on the basis of a difference between the predetermined number of position data sampled at first predetermined time intervals $\Delta Tn$ in one cycle and the ideal position data, and defining the first error data as the error data, calculating second error data on the basis of a difference between position data sampled at second predetermined time intervals $\Delta Tk$ in each of the first predetermined time intervals $\Delta Tn$ and the ideal position data; and, on the basis of error characteristics of the first error data and the second error data, when there is the second error data that is closer to a local extremum or inflexion point in the error characteristics than the first error data, change a time interval of the error data without increasing or decreasing the predetermined number of pieces of the error data by replacing the second error data closest to the local extremum or inflexion point in the error characteristics with any of the pieces of the first error data.

(2) In the encoder signal processing device described in (1), the error data calculation unit may prioritize the second error data that is closest to the local extremum in the error characteristics over the second error data that is closest to the inflexion point in the error characteristics and replace the prioritized error data with the first error data.

(3) In the encoder signal processing device described in (2), the error data calculation unit may prioritize, among second error data that is closest to the local extremum in the error characteristics, second error data that is closest to a local extremum at which a curve that forms the local extremum in the error characteristics has large inclination, and may replace the prioritized error data with the first error data.

(4) In the encoder signal processing device described in (2), the error data calculation unit may prioritize, among second error data that is closest to the inflexion point in the error characteristics, second error data that is closest to a inflexion point at which a curve that forms the inflexion point in the error characteristics, and may replace the prioritized error data with the first error data.

(5) In the encoder signal processing device described in any one of (1) to (4), the compensation unit may perform interpolation processing on the error data calculated by the error data calculation unit to determine error data corresponding to the position data acquired by the position data acquisition unit and compensate the position data with corresponding error data.

(6) An encoder according to the present invention includes the encoder signal processing device described in any one of (1) to (5).

According to the present invention, there can be provided an encoder signal processing device and an encoder that reduce interpolation errors.

DETAILED DESCRIPTION OF THE INVENTION

An exemplary embodiment of the present invention is described below with reference to the attached drawings. It is noted that identical or corresponding components in the figures are denoted by the same reference symbols.

Figure 1:
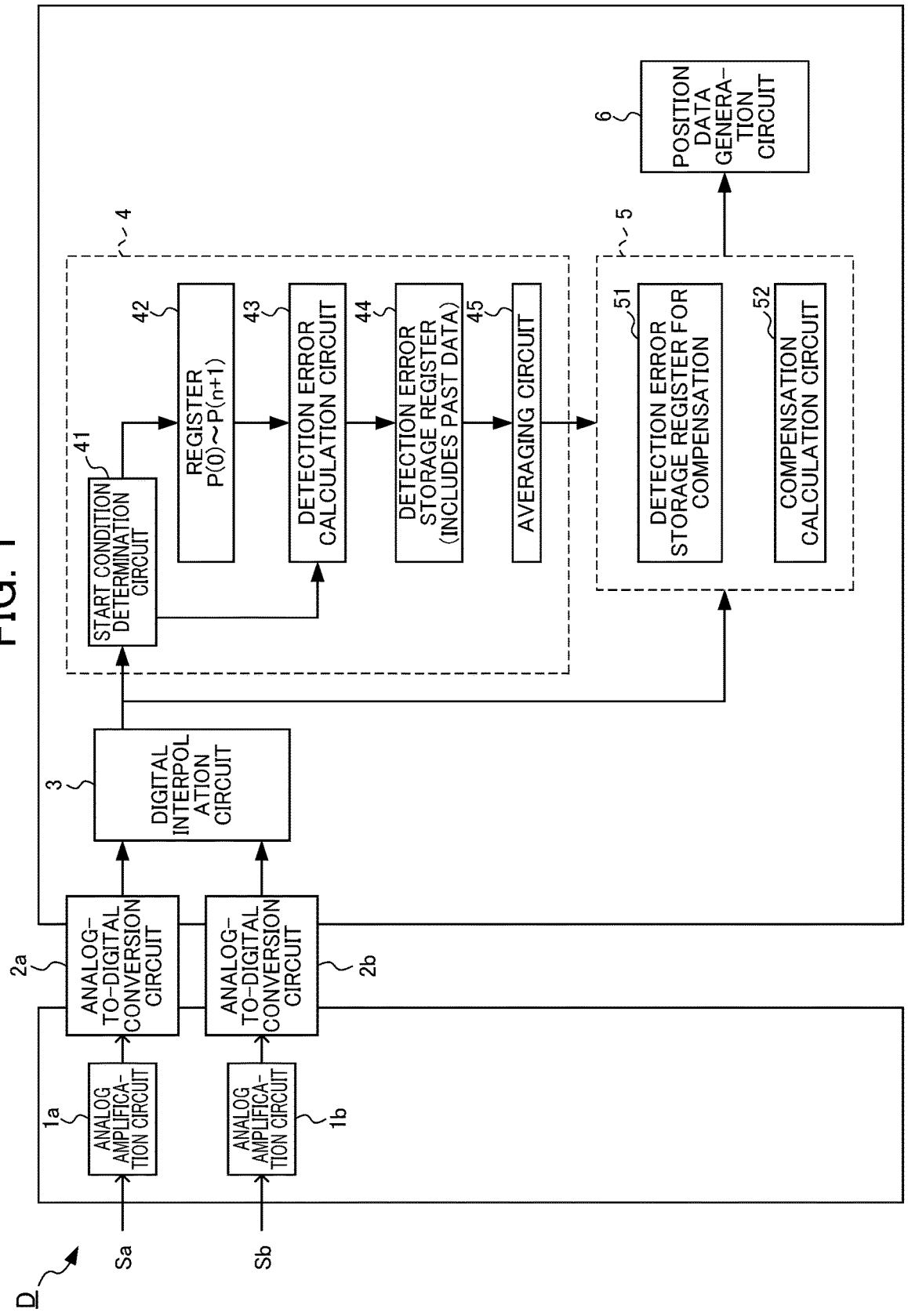
FIG. 1 is a diagram for illustrating the configuration of an encoder signal processing device according to an embodiment.

FIG. 1 is a diagram for illustrating the configuration of an encoder signal processing device according to the present embodiment. The signal processing device D illustrated in FIG. 1 is a device that inputs original signals of a sine wave (a so-called A-phase signal) Sa and a cosine wave (a so-called B-phase signal) that are output from a sensing unit of the encoder. The signal processing device D then converts the original signals from analog to digital to generate position data. The signal processing device D includes analog amplification circuits $1a$ and $1b$, analog-to-digital conversion circuits $2a$ and $2b$, a digital interpolation circuit 3, a detection error data calculation circuit 4, a detection error compensation circuit 5 and a position data generation circuit 6.

The analog amplification circuit $1a$ amplifies the original signal of the sine wave Sa output from the sensing unit of the encoder such that the original signal matches input to the analog-to-digital conversion circuit $2a$ at the next stage. Similarly, the analog amplification circuit $1b$ amplifies the original signal of the cosine wave Sb output from the sensing unit of the encoder such that the original signal matches input to the analog-to-digital conversion circuit 20 at the next stage.

The analog-to-digital conversion circuit $2a$ converts the analog signal amplified by the analog amplification circuit $1a$ to a digital signal at each constant sampling cycle. Similarly, the analog-to-digital conversion circuit $2b$ converts the analog signal amplified by the analog amplification circuit $1b$ to a digital signal at each constant sampling cycle.

The digital interpolation circuit 3 generates position data by calculating positions in one cycle of the original signal (one cycle of the sine wave) on the basis of the digital values converted by the analog-to-digital conversion circuits $2a$ and $2b$. It is noted that the analog amplification circuits $1a$ and $1b$, the analog-to-digital conversion circuits $2a$ and $2b$, and the digital interpolation circuit 3 correspond to position data acquisition units.

The detection error data calculation circuit 4 calculates detection error data on the basis of the position data generated by the digital interpolation circuit 3. The detection error data calculation circuit 4 includes a start condition determination circuit 41, a register group 42, a detection error calculation circuit 43, a detection error storage register 44 and an averaging circuit 45.

The start condition determination circuit 41 determines whether a start condition is satisfied on the basis of the position data generated by the digital interpolation circuit 3. When the start condition is satisfied, the start condition determination circuit 41 stores, in the register group 42, position data for one cycle of the original signal in the register group 42. More specifically, the start condition determination circuit 41 stores a predetermined number n+1 of pieces of position data P(0) to P(n) sampled at first predetermined time intervals (error sampling intervals) $\Delta Tn$ in one cycle from among the position data obtained by sampling the original signal at constant sampling intervals. It is noted that the start condition determination circuit 41 may store, in the register group 42, position data P(0) to P(n+α) that is sampled slightly more frequently than the data sampled for one cycle of the original signal. In addition, the start condition determination circuit 41 stores, in the register group 42, position data sampled at second predetermined time intervals $\Delta Tk$ in each of the first predetermined time intervals $\Delta Tn$. Details of the start condition determination circuit 41 are described later.

The detection error calculation circuit 43 calculates a predetermined number n+1 of pieces of detection error data in one cycle on the basis of the states of the position data P(0) to P(n) at the first predetermined time intervals $\Delta Tn$ and the position data at the second predetermined time intervals $\Delta Tk$ stored in the register group 42. Details of the detection error calculation circuit 43 are described later.

The detection error storage register 44 stores calculated detection error data for the past several sampling occurrences. The averaging circuit 45 averages the several past lots of detection error data stored in the detection error storage register 44. The plurality of groups of detection error data are averaged in order to improve accuracy of the detection error data. When the detection error data is calculated using a simple method, the detection error data obtained by the detection error calculation circuit 43 may be used with no change and the detection error storage register 44 and the averaging circuit 45 do not need to be provided.

The detection error compensation circuit 5 compensates the position data output from the digital interpolation circuit 3 on the basis of the detection error data calculated by the detection error data calculation circuit 4. The detection error compensation circuit 5 includes a detection error storage register for compensation 51 and a compensation calculation circuit 52.

The detection error storage register for compensation 51 stores the average detection error data averaged by the averaging circuit 45 or the detection error data obtained by the detection error calculation circuit 43.

The compensation calculation circuit 52 performs interpolation (for example, linear interpolation) on the detection error data stored in the detection error storage register for compensation 51, to thereby obtain detection error data that corresponds to the position data output from the digital interpolation circuit 3 and compensate the position data with corresponding detection error data. The compensation calculation circuit 52 outputs the compensated position data to the position data generation circuit 6.

The position data generation circuit 6 generates position data using the position data in one cycle compensated by the compensation calculation circuit 52 and data of a counter that counts the cycles of the original signal not shown in the block diagram).

Figure 2:
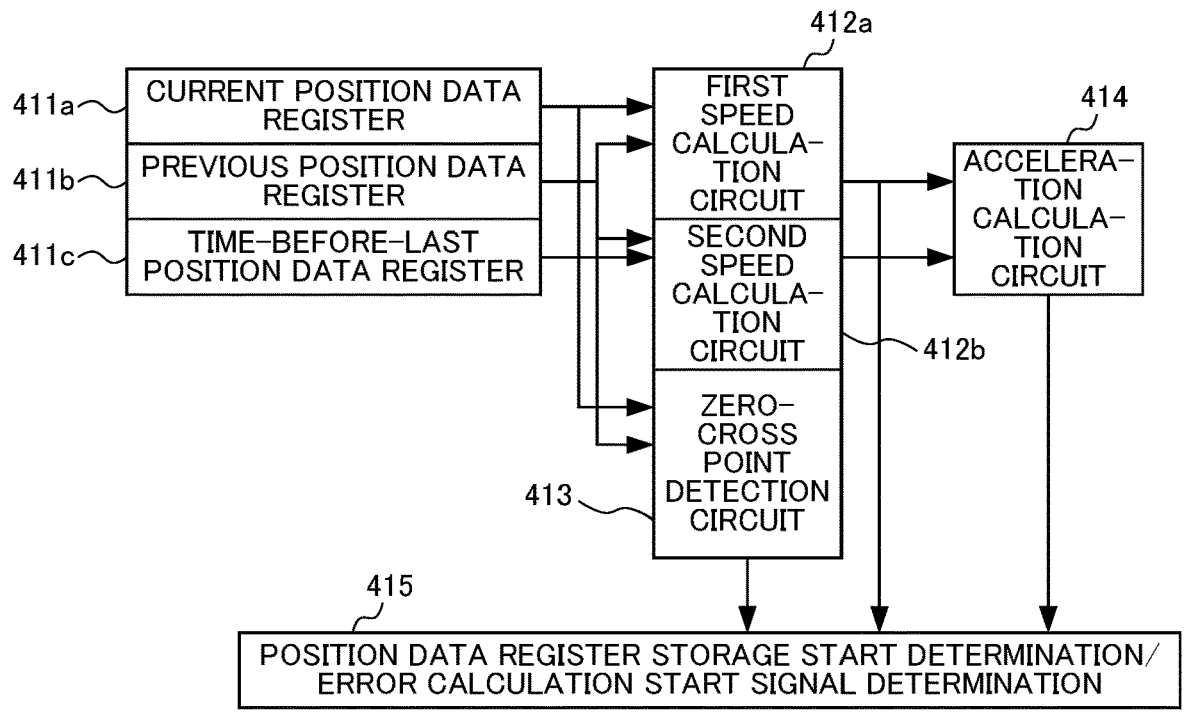
FIG. 2 is a diagram for illustrating the configuration or a start condition determination circuit shown in FIG. 1.

Next, the start condition determination circuit 41 in the detection error data calculation circuit 4 is described. FIG. 2 is a diagram for illustrating the configuration of the start condition determination circuit 41. The start condition determination circuit 41 includes a current position data register 411a, a previous position data register 411b, a time-before-last position data register 411c, first and second speed calculation circuits 412a and 412b, a zero-cross point detection circuit 413, an acceleration calculation circuit 414, and a position data register storage start determination/error calculation start signal determination circuit 415.

The current, previous and time-before-last position data registers 411a, 411b and 411c respectively store position data on the current sampling cycle, the previous sampling cycle, and the sampling cycle before last among the position data output at each predetermined sampling cycle from the digital interpolation circuit 3. The position data stored in each position data register 411a, 411b and 411c is shifted each time the position data is output from the digital interpolation circuit 3 (at each sampling cycle). More specifically, the position data for each predetermined sampling cycle that is output from the digital interpolation circuit 3 is stored in the current position data register 411a, the position data stored in the current position data register 411a becomes stored in the previous position data register 411b, and the position data stored in the previous position data register 411b becomes stored in the time-before-last position data register 411c.

The first speed calculation circuit 412a determines the current speed on the basis of the difference between the current position data stored in the current position data register 411a and the previous position data stored in the previous position data register 411b. The second speed calculation circuit 412b determines the current speed of one cycle before on the basis of the difference between the previous position data stored in the previous position data register 411b and the time-before-last position data stored in the time-before-last position data register 411c. The acceleration calculation circuit 414 determines acceleration on the basis of the difference between the speeds calculated by the first and second speed calculation circuits 412a and 412b. The zero-cross point detection circuit 413 detects the zero-cross point, which is the start point of one cycle of the original signals Sa and Sb, on the basis of the current position data stored in the current position data register 411a and the previous position data stored in the previous position data register 411c.

The position data register storage start determination/ error calculation start signal determination circuit 415 stores, in the register group 42, the position data P(0) to P(n) at the first predetermined time intervals ΔTn and the position data at the second predetermined time intervals ΔTk for one cycle of the original signal that includes the detected zero-cross point to the next zero-cross point when the zero-cross point detection circuit 413 detects the zero-cross point, with a configuration import condition for the position data being satisfied as a condition. The position data register storage start determination/error calculation start signal determination circuit 415 transfers an error calculation start signal to the detection error calculation circuit 43 when the next zero-cross point is detected.

The position data import is a condition that as satisfied when the following occur: the speed (difference between position data P(−1) and P(0)) determined by the first speed calculation circuit 412a is within a predetermined range, and when improving accuracy, the acceleration (difference between the difference between position data P(−2) and P(−1) and difference between P(−1) and P(0)) determined by the acceleration calculation circuit 414 is within a specified range, and when one cycle of the original signal ends, the acceleration (difference between the difference between position data P(n−2) and P(−1) and the difference between P(n−1) and P(n)) detected by the first speed calculation circuit 412a is within a specified range.

Figure 3:
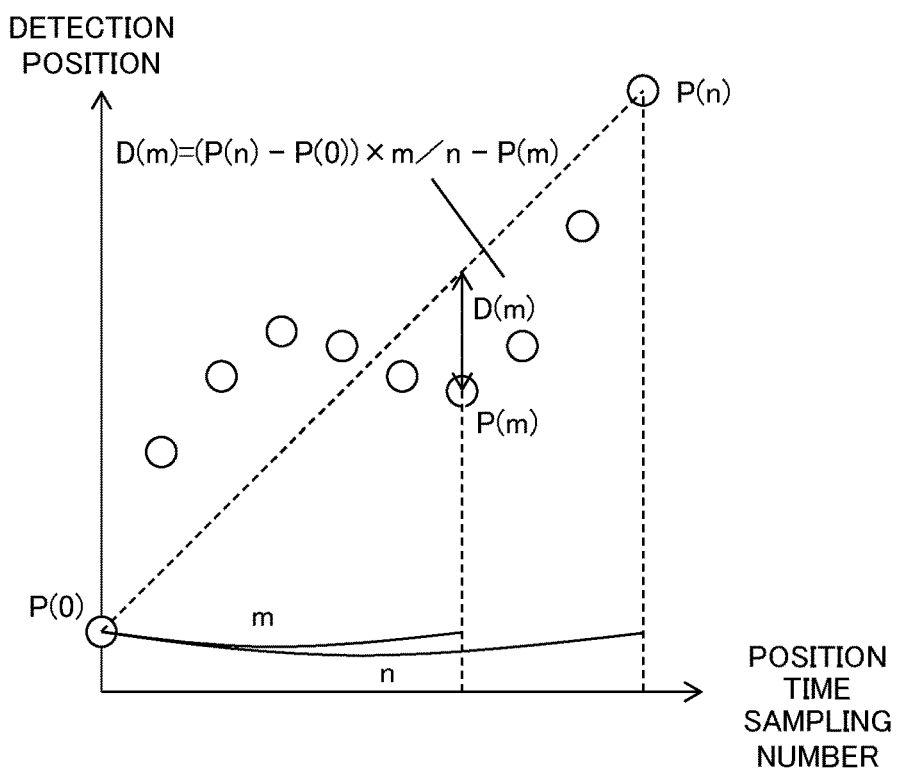
FIG. 3 is a diagram for explaining detection error data calculation processing (conventional processing) by a detection error calculation circuit in a detection error data calculation circuit shown in FIG. 1.

Next, the error calculation circuit 43 in the detection error data calculation circuit 4 is described. FIG. 3 is a diagram for explaining detection error data calculation processing (conventional processing) by the detection error calculation circuit 43 in the detection error data calculation circuit 4. FIG. 3 shows the position data P(0) to P(n) at the first predetermined time intervals ΔTn for one cycle of the original signal. In FIG. 3, the sampling cycle is defined as Ts and the moving speed of a moving object (rotating object) provided with a sensing unit of the encoder is defined as a constant speed v. If the movement amount (rotation angle) of the moving object for one cycle is L, then L=n·Ts·v. If the initial sampling time point after the zero-cross point has been detected is a time 0, the position data sampled at this time is defined as P(0), and position data sampled at the initial sampling point after the next zero-cross point is detected is defined as P(n), then the time from the position data P(0) until the position data P(n) is acquired approximately corresponds to one cycle (P(n)−P(0)=L).

Plotting the position data P(0) to P(n) at the first predetermined time intervals ΔTn in this one cycle with the horizontal axis representing time and the vertical axis representing the position of detection will result in a graph similar to that in FIG. 3 with the position data represented as circles. It is noted that in FIG. 3, the detected position data is repeatedly detected from 0 to L. Therefore, the points until one cycle L is reached are continuously expressed on a straight line as "0" of the next cycle.

Although the position data is determined for every sampling cycle Ts, both the speed v and the sampling cycle Ts are constant. Therefore, the movement distance 1=v·Ts during sampling is constant. As a result, the movement distance (rotational angle) of the moving object is also expressed on the horizontal axis in FIG. 3. In other words, an m-th sampling occurs after the time m·Ts has elapsed from the sampling at which the position data P(0) is acquired. In addition, at the m-th sampling, the movement distance 1 (rotational angle) of the moving object equals the position of m·v·Ts.

Because the moving object moves at the constant speed v, the sampling cycle Ts occurs n-times and the moving object moves the distance L of one cycle of the original signal, the position of the moving object changes linearly and the movement distance 1 is L·m/n at the m-th sampling. Therefore, if the position data P(n) has the same value as one cycle delay of the position data P(0), the position data P(n) is ideally located on the straight broken line shown in FIG. 3 that connects the position data P(0) and P(n). The straight broken line shown in FIG. 3 indicates the position that is ideally detected when the moving object moves by one cycle (ideal position data). However, if the position that is actually sampled and detected is the position P(m) indicated by a circle in FIG. 3, a detection error D(m) is obtained by the following Equation:

$$D(m)=P(m)-[P(0)+L\cdot m/n]=P(m)-[P(0)+\{P(n)-P(0)\}\times m/n] \quad (1).$$

As a result, the detected position data P(m) at each sampling position m(=0, 1, 2 . . . ) is defined as the position data Ps(m) of reference data, and the detection error D(m) determined at each sampling position is defined as the detection error D(m) of the reference data, these are associated and stored. In other words, all of the detection errors D(0) to D(n) are determined by the detection error calculation circuit 43 performing the above-described. Equation (1) on the position data P(0) to P(n) for one cycle stored in the register group 42 illustrated in FIG. 2. In this example, averaging is not performed and the detection errors D(0) to D(n) determined by the detection error calculation circuit 43 are stored in the detection error storage register for compensation 51 as reference data [Ps(0) to Ps(n) and D(0) to D(n)] in association with the detection position data P(0) to P(n) (this detected position data is defined as the detected position data Ps(0) to Ps(n) of the reference data).

Then, the compensation calculation circuit 52 compares the position data P(x) output from the digital interpolation circuit 3 and the position data Ps(0) to Ps (n) of the reference data stored in the detection error storage register for compensation 51. When the detected position data P(x) is between the position data Ps (m) and Ps (m+1) stored in the detection error storage register for compensation 51, the detection error D(x) for the detected position data P(x) is found through interpolation calculation (for example, linear interpolation) using the detection error data D(m) and D(m+1) stored for the position data Ps(m) and Ps(m+1). Assuming that the calculated detection error D(x) is included in the detected position data P(x), the compensation calculation circuit 52 subtracts the detection error D(x) from the detected position data P(x) to compensate the error and outputs this data as position data within one cycle.

As described above, in this embodiment, in order to increase calculation speed of the detection error data calculation circuit 4 and the detection error compensation circuit 5 and reduce capacity of the registers, the sampling number n of the detection error data is made to be less than the sampling number of the position data, and the detection error data is compensated using interpolation (for example, linear interpolation). This configuration results in the following problems.

Figure 4:
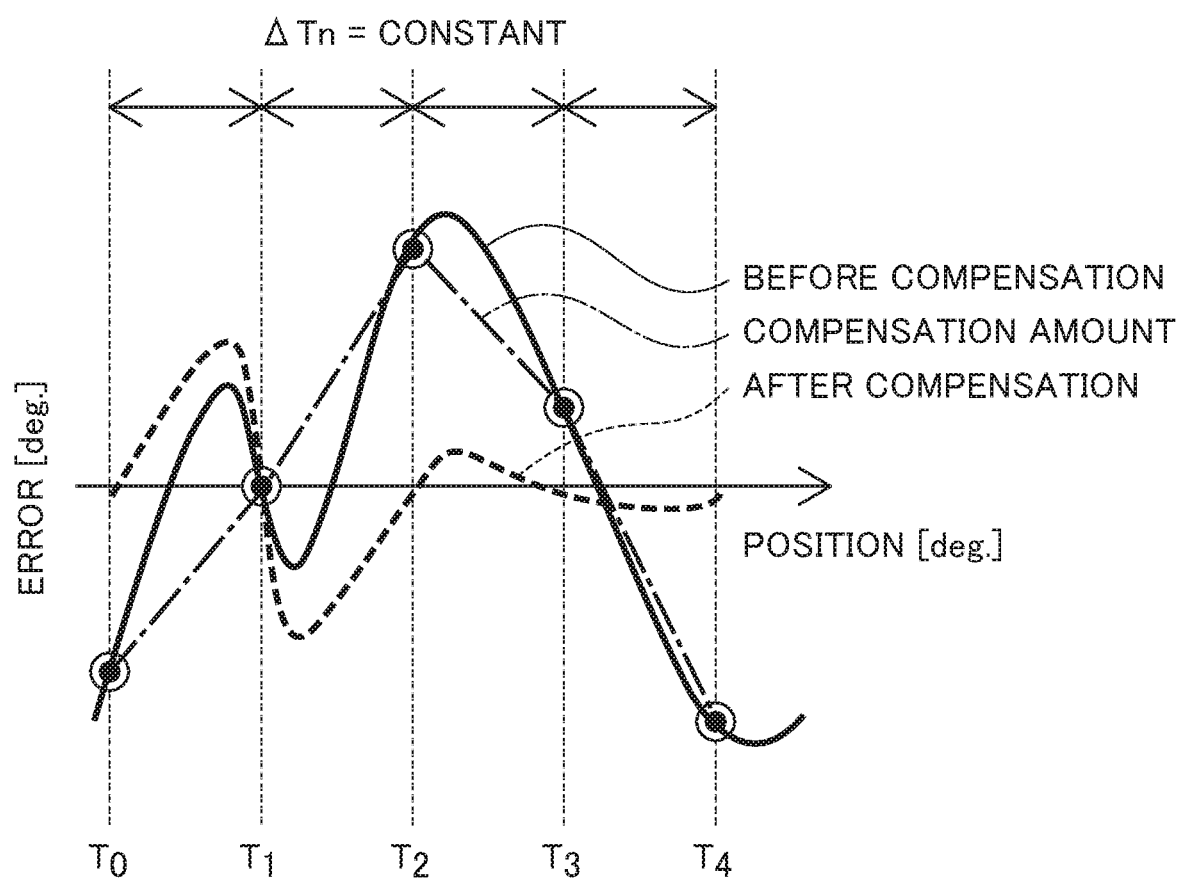
FIG. 4 is a schematic diagram for illustrating an example of detection error data calculation processing (conventional processing) by the detection error data calculation circuit and detection error compensation processing (conventional processing) by a detection error compensation circuit.

FIG. 4 is a schematic diagram for illustrating an example of detection error data calculation processing (conventional processing) by the detection error calculation circuit 4 and detection error compensation processing (conventional processing) by the detection error compensation circuit 5. FIG. 4 shows error characteristics (before compensation) of error data at a predetermined number n+1=5 of compensation points T0 to T4 obtained by dividing one cycle into n=4 at the first predetermined time intervals (equal intervals) ΔTn. As illustrated in FIG. 4, a linear approximation curve (compensation amount) is determined through linear interpolation between the compensation points T0 to T4 for the error characteristics (before compensation) of the error data. When the position data is compensated using the determined linear approximation curve (compensation amount), local extrema in the error characteristics (before compensation) of the error data may be overlooked and errors (after compensation) may remain in the position data after compensation.

Figure 5:
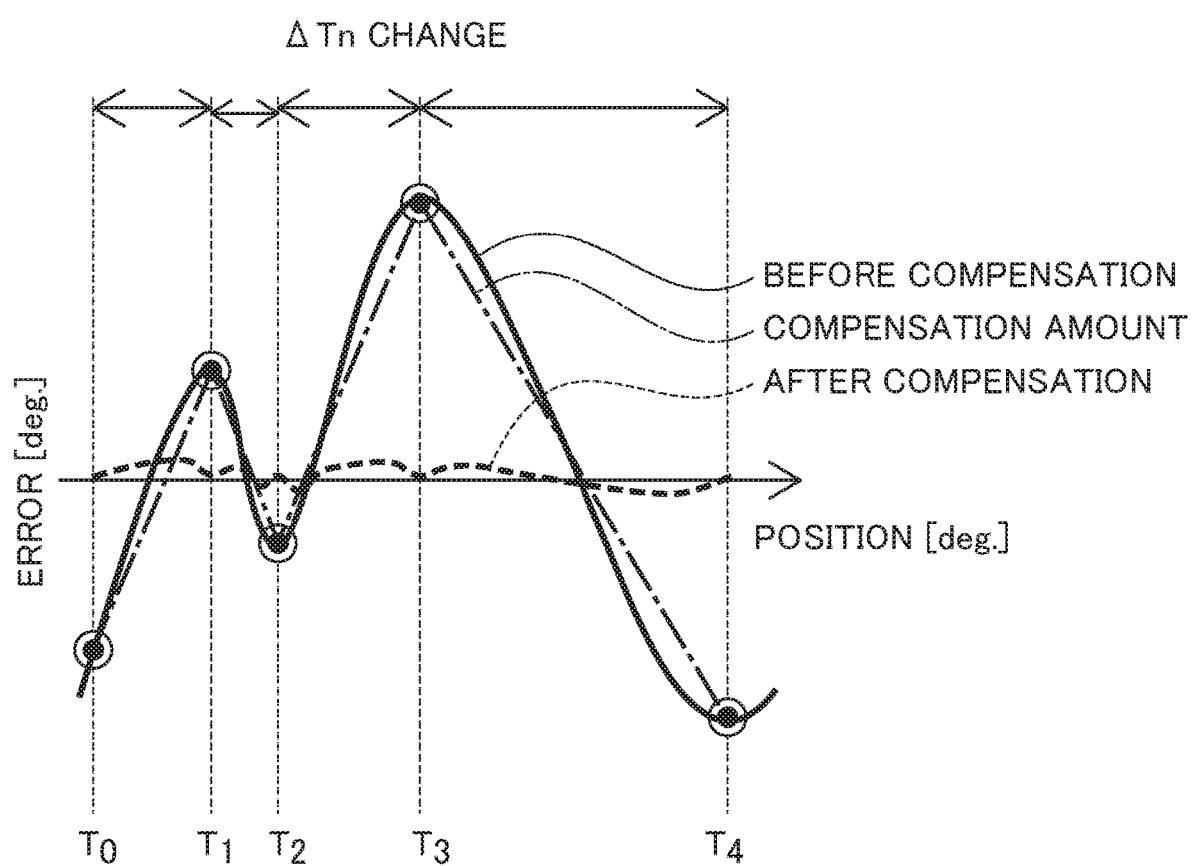
FIG. 5 is a schematic diagram for illustrating an example of detection error data calculation processing (processing according to the present invention) by a detection error data calculation circuit and detection error compensation processing (processing according to the present invention) by a detection error compensation circuit.

FIG. 5 is a schematic diagram for illustrating an example of detection error data calculation processing (processing according to the present invention) by the detection error data calculation circuit 4 and detection error compensation processing (processing according to the present invention) by the detection error compensation circuit 5. As illustrated in FIG. 5, in this embodiment, the first predetermined time intervals ΔTn are changed without increasing or decreasing the number of compensation points such that the compensation points T1, T2, T3 and T4 among the five compensation points T0 to 14 are in the vicinity of local extremum or a inflexion point in the error characteristics of the error data (before compensation). As a result, the linear approximation curve can be determined through linear interpolation between the compensation points T0 to T4 in the error characteristics (before compensation) of the error data, and the number of errors (after compensation) in the position data after compensation can be reduced even if the position data is compensated using the linear approximation curve (compensation amount).

Figure 6:
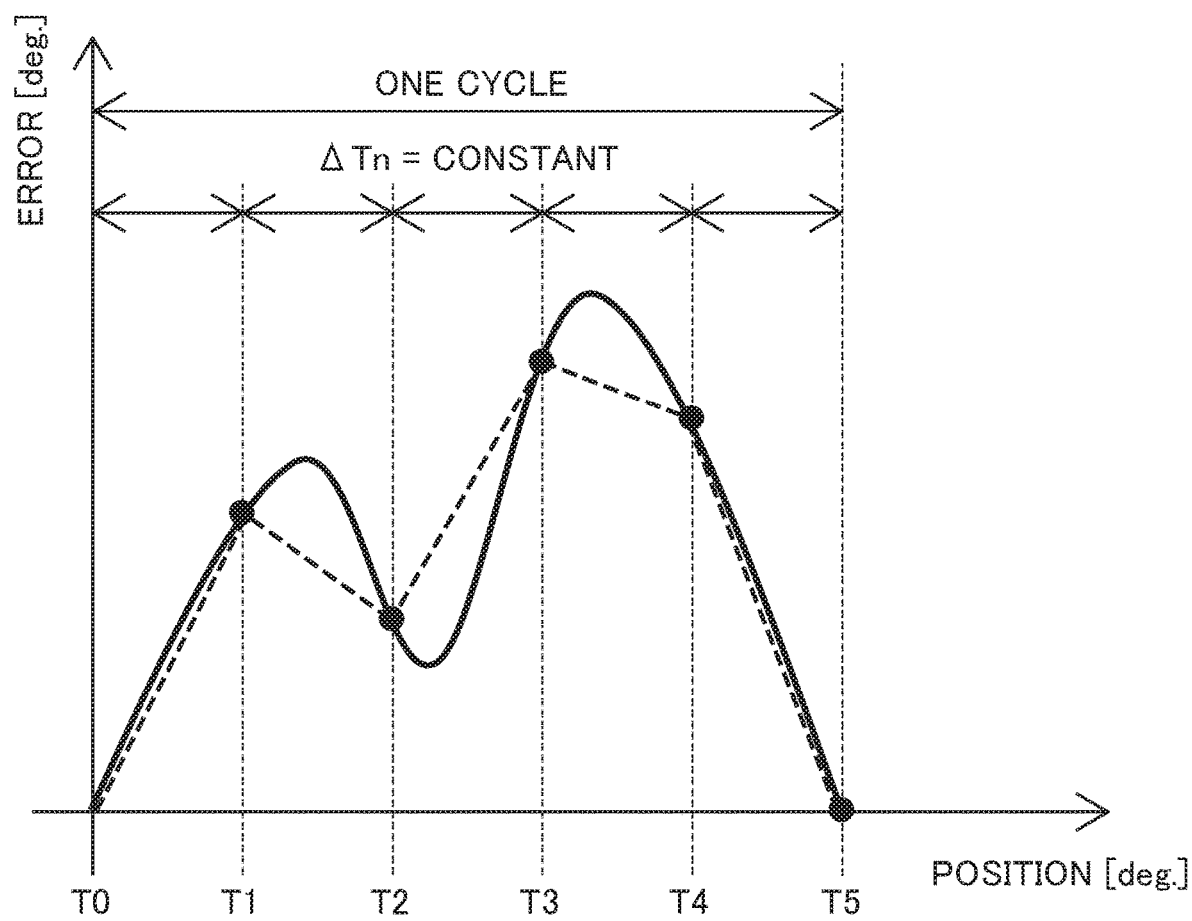
FIG. 6 is a schematic diagram for illustrating an example of the detection error data calculation processing (conventional processing) by the detection error data calculation circuit.
Figure 7:
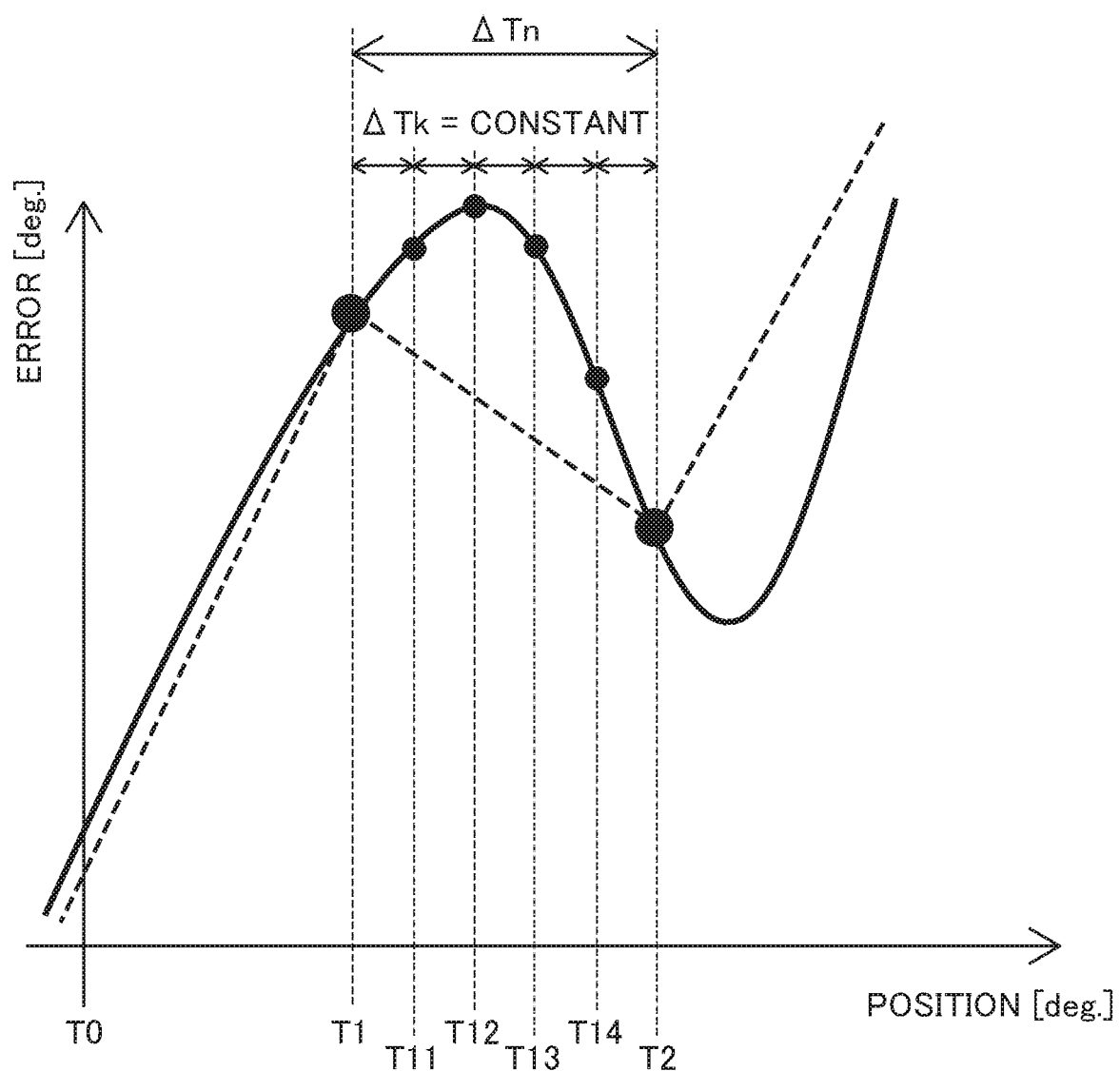
FIG. 7 is a schematic diagram for illustrating an example of the detection error data calculation processing (processing according to the present invention) by the detection error data calculation circuit.
Figure 8:
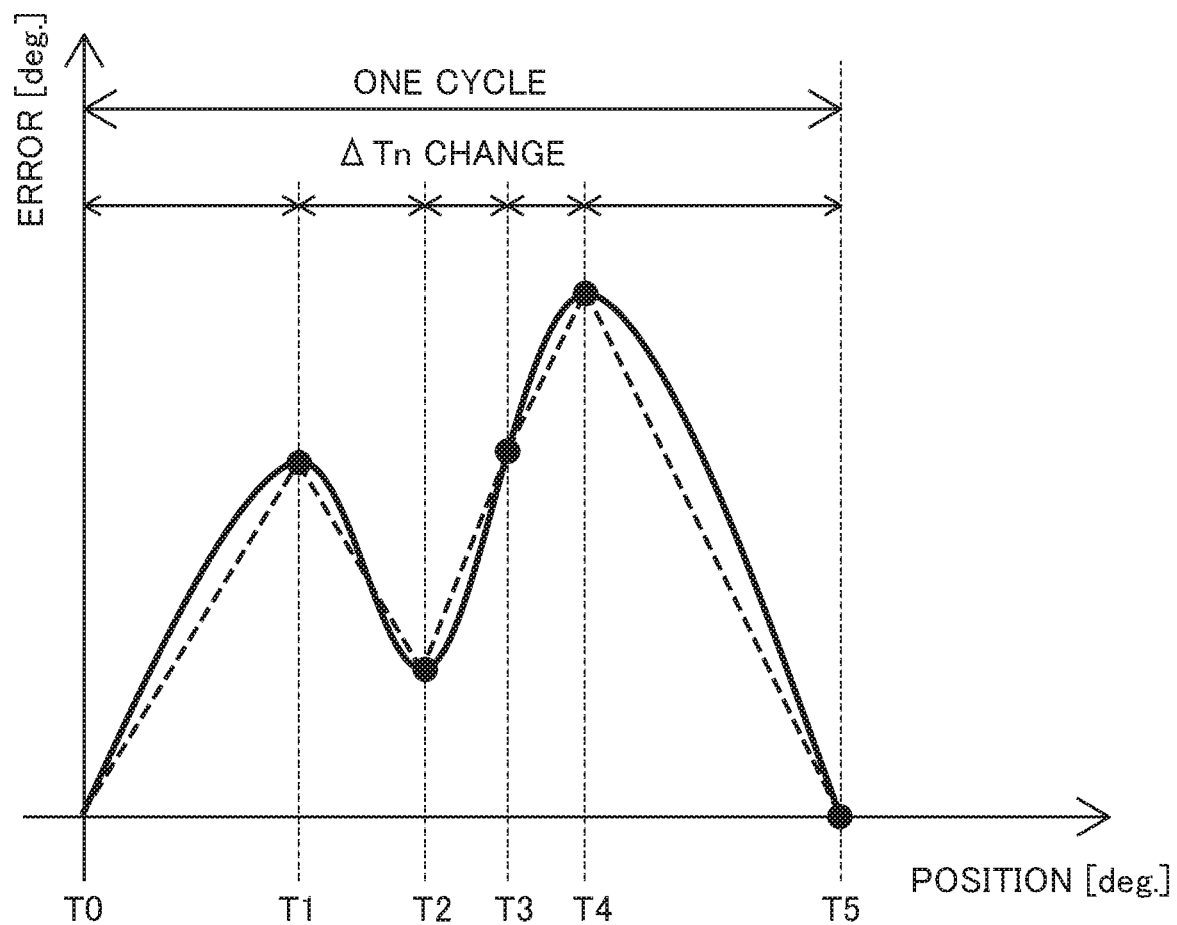
FIG. 8 is a schematic diagram for illustrating an example of the detection error data calculation processing (processing according to the present invention) by the detection error data calculation circuit.

Detection error data calculation processing (processing according to the present invention) by the detection error data calculation circuit 4 is described below with reference to FIGS. 6 to 8. FIG. 6 is a schematic diagram for illustrating an example of the detection error data calculation processing (conventional processing) by the detection error data calculation circuit 4, and FIGS. 7 and 8 are schematic diagrams for illustrating an example of the detection error data calculation processing (processing according to the present invention) by the detection error data calculation circuit 4. It is noted that in FIGS. 6 to 8, the sampling number is different to that in FIGS. 4 and 5 for the sake of convenience.

More specifically, as described above, the detection error data calculation circuit 4 calculates error data on the basis of the difference between the predetermined number n+1 of pieces of position data P(0) to P(n) that are sampled at the first predetermined time intervals (error sampling intervals, compensation intervals) ΔTn and the ideal position data in one cycle. As described above, the ideal position data is position data that assumes that the position moves linearly in one cycle. As a result, as illustrated in FIG. 6 for example, it is possible to determine the error characteristics (black circles on the straight lines) of error data at the predetermined number n+1=6 of compensation points T0 to T5 obtained by diving one cycle into n=5 at the first predetermined time intervals (constant intervals) ΔTn. At this time, as described above, when the detection error compensation circuit 5 performs linear interpolation between the six compensation points T0 to T5 to determine the linear approximation curve (dashed line) and compensates (linear compensation) the position data using the determined linear approximation curve, local extrema in the error characteristics of the error data may be overlooked and errors may remain in the compensated position data.

As a result, the detection error data calculation circuit 4 further calculates error data on the basis of the difference between the position data sampled at the second predetermined time intervals ΔTk in each of the first predetermined time intervals ΔTn and the ideal position data. As a result, as illustrated in FIG. 7 for example, it is possible to obtain error characteristics (black circles on the solid line) of the error data at the six compensation points T1, T11 to T14 and T2 obtained by dividing the first predetermined time intervals ΔTn into k=5 at the second predetermined time intervals (equal intervals) ΔTk.

When there is error data at a second predetermined time interval ΔTk that is closer to local extremum or inflexion point in the error characteristics of the error data than the error data at a first predetermined time interval ΔTn, the detection error data calculation circuit 4 replaces the error data at the second predetermined time interval ΔTk closest to the local extremum or inflexion point in the error characteristics with the error data at the first predetermined time interval ΔTn on the basis of the error data at the first predetermined time interval ΔTn and the error data at the second predetermined time interval ΔTk. For example, as illustrated in FIG. 7, when there is error data at the compensation point T12 that is closer to the local extremum in the error characteristics than the error data of the compensation points T1 and T2, the detection error data calculation circuit 4 replaces the error data at the compensation point T12 that is closest to the local extremum in the error characteristics with the error data of the compensation point T1 or T2. As a result, as illustrated in FIG. 8 for example, the detection error data calculation circuit 4 changes the time intervals ΔTn of the error data without increasing or decreasing the amount of error data.

At this time, the detection error data calculation circuit 4 may replace error data at the second predetermined time interval ΔTk closest to the local extremum in the error characteristics with error data at the first predetermined time intervals ΔTn with priority over the error data at the second predetermined time intervals ΔTk that is closest to the inflexion point in the error characteristics. The detection error data calculation circuit 4 may prioritize, among the error data at the second predetermined time intervals ΔTk closest to the local extremum in the error characteristics, the error data at the second predetermined time intervals ΔTk that is closest to the local extremum at which the inclination of the curve that forms the local extremum in the error characteristics and replace that error data with the error data at the first predetermined time intervals ΔTn. In addition, the detection error data calculation circuit 4 may prioritize, among the error data at the second predetermined time intervals ΔTk closest to the inflexion point in the error characteristics, error data at the second predetermined time intervals ΔTk that is closest to the inflexion point at which the curve that forms the inflexion point in the error characteristics has large inclination, and replace that error data with the error data at the first predetermined time intervals ΔTn.

In the above-described embodiments, the detection error data calculation circuit 4 is provided with the start condition determination circuit 41 and the detection error data calculation circuit 4 uses the start condition determination circuit 41 to determine, import data to the register group 42 and output a command for calculating the reference data. However, the start condition determination circuit 41 may not be provided, and a control device such as a numerical control device that controls a device or apparatus provided with the encoder may determine the start condition, import data from the control device and output the command for calculating the reference data.

Figure 9:
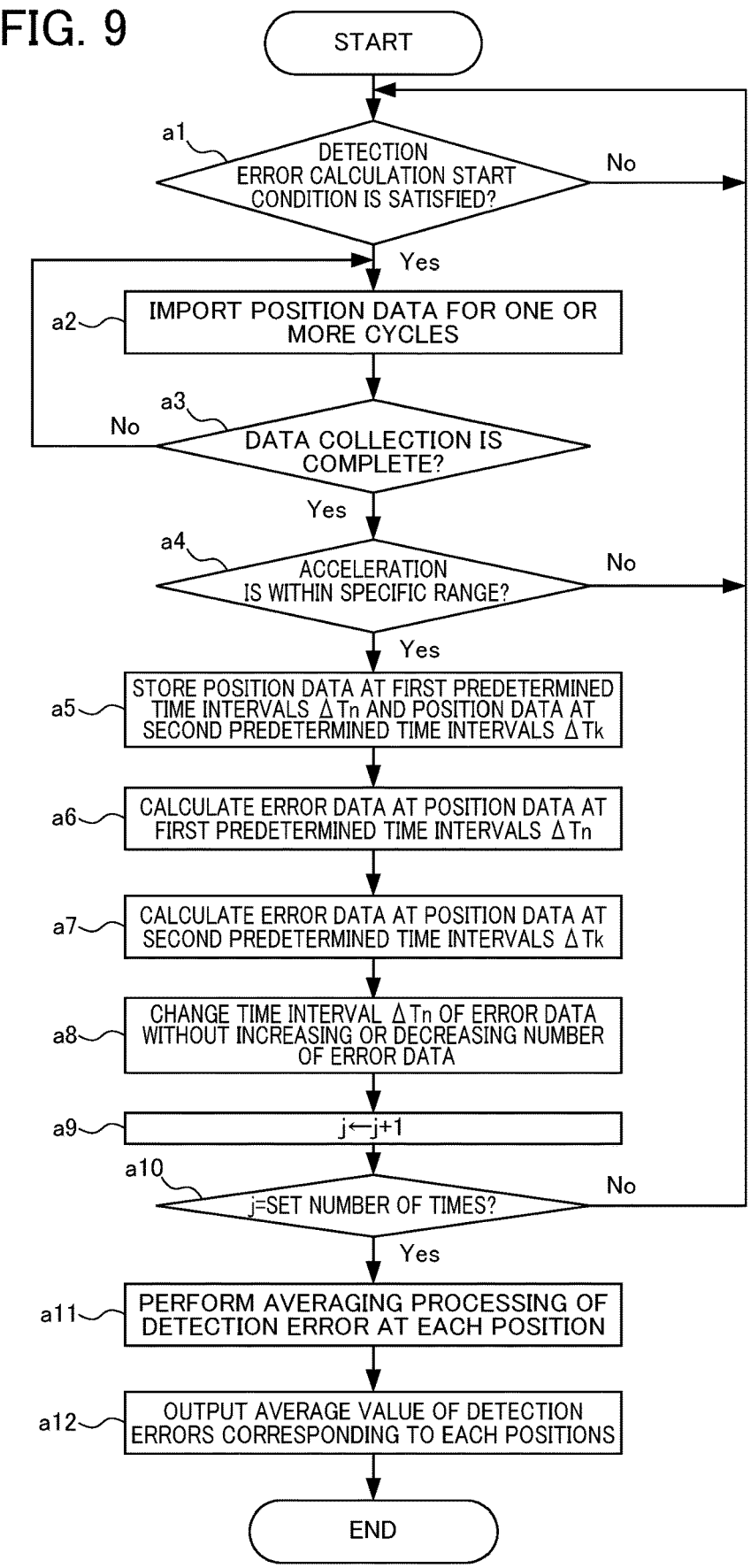
FIG. 9 is a flowchart illustrating the detection error data calculation processing by a processor when the detection error data calculation circuit is configured as a processor.

In addition, the detection error data calculation circuit 4 and the detection error compensation circuit 5 may be configured as a processor and made to perform the detection error data calculation processing and the detection error compensation processing by software. FIG. 9 is a flowchart illustrating detection error data calculation processing by a processor when the detection error data calculation circuit 4 is configured as a processor. First, when a reference data generation command is input manually or from the control device that controls the device or apparatus provided with the encoder, the processor determines whether a configuration detection error calculation start condition is satisfied on the basis of the sampling position data output by the digital interpolation circuit 3. In other words, the processor determines whether the current speed is a specified value and whether the acceleration is within a specified range (Step a1).

When it is determined that the configuration detection error calculation start condition is satisfied, the processor imports the sampling position data output from the digital interpolation circuit 3 for one cycle (Steps a2 and a3). When the import of this data is complete, the processor determines whether the acceleration is within the specified range when import of the position data for one cycle is complete (Step a4). When the acceleration is not within the specified range, it is determined that there has been a change in speed within the cycle for which the position data was acquired and the processor returns to Step a1 to import the position data again.

In Step a4, when it is determined that the acceleration is within the specific range, the imported position data is determined to be data with a constant speed, and the processor stores the position data P(0) to P(n) sampled at the first predetermined time intervals ΔTn in the cycle and the position data sampled at the second predetermined time intervals ΔTk in each of the first predetermined time intervals ΔTn from the acquired position data (Step a5).

The processor calculates error data on the basis of the difference between the position data P(0) to P(n) at the first predetermined time intervals ΔTn in one cycle and ideal position data (Step a6). Further, the processor calculates error data on the basis or the difference between the position data at the second predetermined time intervals ΔTk in each first predetermined time interval ΔTn and ideal position data.

When there is error data at a second predetermined time interval ΔTk that is closer to the local extremum or inflexion point in the error characteristics of the error data than error data at a first predetermined time interval ΔTn, the processor replaces the error data at the second predetermined time intervals ΔTk closest to the local extremum or inflexion point in the error characteristics with the error data at the first predetermined time intervals ΔTn on the basis of the error data at the first predetermined time intervals ΔTn and the error data at the second predetermined time intervals ΔTk. In other words, the processor changes the time intervals ΔTn or the error data without increasing or decreasing the amount of error data such that the compensation points are in the vicinity of the local extremum or inflexion point in the error characteristics of the error data. The processor stores the error data (Step a8).

The processor increments an index j by 1 (the index is set to "0" at initialization) and determines whether the value of the index j is a set number of times (Steps a9 and a10). When the index j is not a set number of times, the processor returns to Step a1. The processor iterates the processing from Steps a1 to a10 and, when the index j reaches the set number of times, the processor determines the average over j-number of detection errors stored in association with predicted detection positions (Step a11). Then, the processor stores a combination of the predicted detection positions and the average of the detection errors as reference data (Step a12) and ends the processing of acquiring the reference data.

Figure 10:
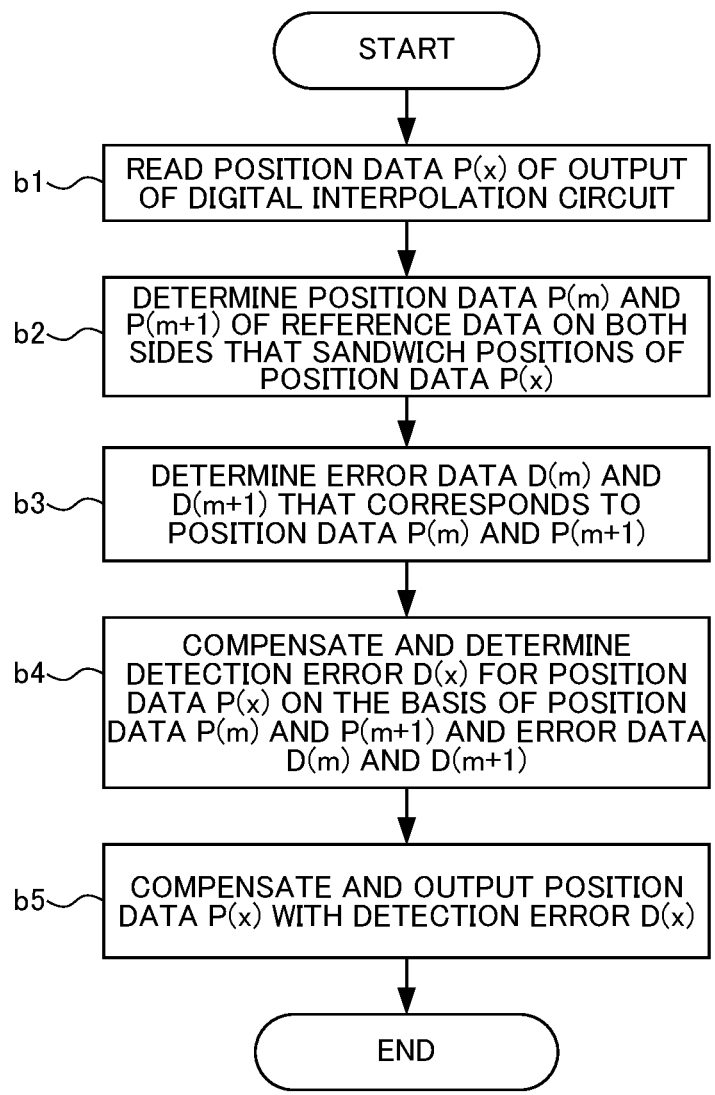
FIG. 10 is a flowchart illustrating the detection error compensation processing by a processor when a detection error compensation circuit is configured as a processor.

FIG. 10 is flowchart illustrating detection error compensation processing by a processor when the detection error compensation circuit 5 is configured as a processor. The processor reads the position data P(x) that is output from the digital interpolation circuit 3 (Step b1) and determines the front and rear position data P(m) and P(m+1) of the position data P(x) that was read out from the position data stored as the reference data (Step b2). The processor determines the detection error data D(m) and D(m+1) stored in relation to the determined position data P(m) and P(m+1) (Step b3) and performs interpolation calculation processing to obtain the detection error D(x) for the read position data P(x) on the basis of the position data P(m) and P(m+1) and the error data D(m) and D(m+1) (Step b4). The processor uses the determined detection error D(x) to compensate the read position data P(x) and output the position data P(x) as detected position data in one cycle (Step b5).

As a result, the position data generation circuit 6 outputs as position data on the basis of the compensated detected position data and a data value of the counter that counts cycles.

As described above, with the encoder signal processing device D according to this embodiment, the detection error data calculation circuit 4 calculates the predetermined number n+1 of pieces of error data in the position data sampled at the first predetermined time intervals ΔTn in one cycle and defines the error data at the first predetermined time intervals ΔTn (first error data) as error data. In addition, the detection error data calculation circuit 4 calculates error data (second error data) in position data sampled at second predetermined time intervals ΔTk in each of the first predetermined time intervals ΔTn. When there is error data at a second predetermined time interval ΔTk that is closer to a local extremum or inflexion point in the error characteristics than error data at a first predetermined time interval ΔTn, the detection error data calculation circuit 4 replaces the error data at the second predetermined time interval ΔTk closest to the local extremum or inflexion point in the error characteristics with any error data at the first predetermined time intervals ΔTn on the basis of the error characteristics of the error data at the first predetermined time intervals ΔTn and the error data at the second predetermined time intervals ΔTk. With this configuration, the detection error data calculation circuit 4 changes the first predetermined time intervals ΔTn (time intervals of the error data) without increasing or decreasing the number of compensation points (sampling number of error data) such that the compensation points are in the vicinity the local extremum or inflexion point in the error characteristics of the error data. As a result, errors (interpolation errors) in the compensated position data can be reduced even if a linear approximation curve is determined through performing linear interpolation between the compensation points in the error characteristics of the error data and using the determined linear approximation curve to compensate the position data. Therefore, detection accuracy of the encoder can be improved.

It is noted that in Patent Document 1 (first embodiment), there is disclosed a technology for shifting all compensation points such that at least one of the compensation points match a local extremum in an error curve. However, because the intervals between the compensation points are constant, it is impossible to make all the local extrema in the error curve match the compensation points. In addition, in Patent Document 1 (second embodiment), there is disclosed a technology for changing the interval width of a compensation interval according to the size of an error using the local maximum (maximal value), the local minimum (minimal value) and a inflexion point, in the shape of error characteristics, more specifically, a technology of narrowing the interval width of a compensation interval at a place with a large error and widening the interval width of a compensation interval at a place with a small error. However, in this case, the number of compensation points may increase and signal processing time, that is, detection time may also increase. Further, Patent Document 1 states that these methods may be combined, but there is no mention of a technology that can shift compensation points to a local extremum or inflexion point in error characteristics without increasing or decreasing the number of compensation points.

An embodiment of the present invention has been described above, but the present invention is not limited to the above-described embodiment and may be changed or altered in various ways.

EXPLANATION OF REFERENCE NUMERALS

D encoder signal processing device
1a, 1b analog amplification circuit (position data acquisition unit)
2a, 2b analog-to-digital conversion circuit (position data acquisition unit)
3 digital interpolation circuit (position data acquisition unit)
4 detection error data calculation circuit (error data calculation unit)
41 start condition determination circuit
42 register
43 detection error calculation circuit
44 detection error storage register
45 averaging circuit
411a, 411b, 411c position data register
412a first speed calculation circuit
412b second speed calculation circuit
413 zero-cross point detection circuit
414 acceleration calculation circuit
415 position data register storage start determination/error calculation start signal determination circuit
5 detection error compensation circuit.
51 detection error storage register for compensation
52 compensation calculation circuit
6 position data generation circuit

What is claimed is:
1. An encoder signal processing device that performs signal processing on analog signals that are periodically generated according to movement of a measurement target, to thereby generate position data according to the position of the measurement target, the encoder signal processing device comprising:
a position data acquisition unit that samples the analog signals to acquire the position data according to the position of the measurement target;
an error data calculation unit that calculates error data on the basis of a difference between a predetermined number of pieces of position data among position data for one cycle acquired by the position data acquisition unit and ideal position data that assumes that the position moves linearly in one cycle; and
a compensation unit that compensates the position data acquired by the position data acquisition unit on the basis of the error data calculated by the error data calculation unit, the error data calculation unit:

calculating first error data on the basis of a difference between the predetermined number of position data sampled at first predetermined time intervals ΔTn in one cycle and the ideal position data, and defining the first error data as the error data, calculating second error data on the basis of a difference between position data sampled at second predetermined time intervals ΔTk in each of the first predetermined time intervals ΔTn and the ideal position data; and on the basis of error characteristics of the first error data and the second error data, when there is the second error data that is closer to a local extremum or inflexion point in the error characteristics than the first error data, change a time interval of the error data without increasing or decreasing the predetermined number of pieces of the error data by replacing the second error data closest to the local extremum or inflexion point in the error characteristics with any of the pieces of the first error data.

2. The encoder signal processing device according to claim 1, wherein the error data calculation unit prioritizes the second error data that is closest to the local extremum in the error characteristics over the second error data that is closest to the inflexion point in the error characteristics and replaces the prioritized error data with the first error data.

3. The encoder signal processing device according to claim 2, wherein the error data calculation unit prioritizes, among the second error data closest to the local extremum in the error characteristics, second error data closest to a local extremum at which a curve that forms the local extremum in the error characteristics has a large inclination, and replaces the prioritized error data with the first error data.

4. The encoder signal processing device according to claim 2, wherein the error data calculation unit prioritizes, among the second error data closest to the inflexion point in the error characteristics, second error data closest to a inflexion point at which a curve that forms the inflexion point in the error characteristics has a large inclination, and replaces the prioritized error data with the first error data.

5. The encoder signal processing device according to claim 1, wherein the compensation unit performs interpolation processing on the error data calculated by the error data calculation unit to determine error data corresponding to the position data acquired by the position data acquisition unit and compensate the position data with corresponding error data.

6. An encoder comprising the encoder signal processing device of claim 1.

* * * * *